(12) United States Patent
Kuepper et al.

(10) Patent No.: US 11,628,875 B2
(45) Date of Patent: Apr. 18, 2023

(54) STEERING ASSEMBLY HAVING A TILT STEERING WHEEL

(71) Applicant: Ford Global Technologies, LLC, Dearborn, MI (US)

(72) Inventors: Philipp Kuepper, Grevenbroich (DE); Martin Faßbender, Buschhoven (DE); Simon John William Hurr, Grays (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/592,011

(22) Filed: Feb. 3, 2022

(65) Prior Publication Data

US 2022/0258788 A1 Aug. 18, 2022

(30) Foreign Application Priority Data

Feb. 12, 2021 (DE) .......................... 102021103391.8

(51) Int. Cl.
| | | |
|---|---|---|
| *B60R 25/02* | (2013.01) | |
| *B60Q 3/283* | (2017.01) | |
| *B62D 1/04* | (2006.01) | |
| *B62D 1/10* | (2006.01) | |
| *B60R 25/022* | (2013.01) | |
| *G05G 5/02* | (2006.01) | |
| *G05G 5/03* | (2008.04) | |

(52) U.S. Cl.
CPC ............... *B62D 1/10* (2013.01); *B60Q 3/283* (2017.02); *B60R 25/0225* (2013.01); *G05G 5/02* (2013.01); *G05G 5/03* (2013.01)

(58) Field of Classification Search
CPC ... B62D 1/06; B62D 1/08; B62D 1/10; B62D 1/183; B62D 1/184; B60R 25/0224; B60R 25/0225; B60Q 3/283; G05G 5/02; G05G 5/03
See application file for complete search history.

(56) References Cited

U.S. PATENT DOCUMENTS

| | | | | |
|---|---|---|---|---|
| 1,315,261 A | * | 9/1919 | E. H. ........................ | B62D 1/10 |
| | | | | 74/556 |
| 1,481,929 A | * | 1/1924 | Preston ............... | B60R 25/0224 |
| | | | | 74/556 |

(Continued)

FOREIGN PATENT DOCUMENTS

| | | | |
|---|---|---|---|
| CN | 105365750 A | * | 3/2016 |
| DE | 1916652 U | | 5/1965 |

(Continued)

*Primary Examiner* — Adam D Rogers
(74) *Attorney, Agent, or Firm* — Vichit Chea; Price Heneveld LLP

(57) ABSTRACT

A steering assembly for a vehicle includes a tilt steering wheel which is capable of being positioned in at least one steering position and at least one non-steering position, wherein the tilt steering wheel can be locked in the at least one non-steering position by a first locking mechanism. The steering assembly includes a second locking mechanism for additionally locking the tilt steering wheel in the at least one non-steering position, wherein the second locking mechanism comprises a locking device which is movable from a locking position into a release position and vice versa using an actuating mechanism.

18 Claims, 3 Drawing Sheets

(56) References Cited

U.S. PATENT DOCUMENTS

| | | | | |
|---|---|---|---|---|
| 1,484,892 | A * | 2/1924 | Lobdell | B62D 1/08 |
| | | | | 74/555 |
| 3,691,866 | A * | 9/1972 | Berkes | B62D 1/184 |
| | | | | 16/334 |
| 7,259,659 | B2 * | 8/2007 | Liu | B60R 25/252 |
| | | | | 340/426.31 |
| 9,873,446 | B2 * | 1/2018 | Gardner | B60Q 9/00 |
| 10,562,558 | B1 * | 2/2020 | Spahn | B62D 1/10 |
| 10,800,441 | B2 * | 10/2020 | Board | B62D 1/11 |
| 11,072,359 | B2 * | 7/2021 | Murray | B62D 1/184 |
| 11,148,700 | B1 * | 10/2021 | Helmstetter | B60R 21/203 |
| 11,230,315 | B2 * | 1/2022 | Kastelic | B62D 1/08 |
| 11,352,043 | B2 * | 6/2022 | Faßbender | B62D 1/10 |
| 11,453,429 | B2 * | 9/2022 | Helmstetter | B62D 1/04 |
| 2020/0283054 | A1 * | 9/2020 | Murayama | B62D 1/183 |
| 2022/0169300 | A1 * | 6/2022 | Kuepper | B62D 1/187 |

FOREIGN PATENT DOCUMENTS

| | | | | |
|---|---|---|---|---|
| DE | 3725908 | A1 | 2/1989 | |
| DE | 19523214 | A1 | 1/1997 | |
| DE | 69708735 | T2 | 7/2002 | |
| DE | 102005044289 | A1 | 3/2007 | |
| DE | 102017223111 | A1 * | 6/2019 | |
| DE | 102019205965 | A1 * | 10/2020 | |
| DE | 102019134898 | A1 * | 6/2021 | B62D 1/04 |
| WO | 2018060443 | A1 | 4/2018 | |
| WO | WO-2021205039 | A1 * | 10/2021 | |

* cited by examiner

STEERING ASSEMBLY HAVING A TILT STEERING WHEEL

CROSS-REFERENCE TO RELATED APPLICATION

This application claims foreign priority benefits under 35 U.S.C. § 119(a)-(d) to German Application No. 102021103391.8 filed Feb. 12, 2021, which is hereby incorporated by reference in its entirety.

FIELD OF THE DISCLOSURE

The present disclosure generally relates to vehicle steering wheels, and more particularly relates to a steering assembly for a vehicle having a tilt steering wheel.

BACKGROUND OF THE DISCLOSURE

Steering assemblies having tilt steering wheels for use in vehicles typically have a tilting mechanism. In order to provide sufficient freedom of movement for the driver in situations in which the driver does not require the steering wheel and it is safe to do so, the steering wheel as a whole can be tilted. This is useful, for example, in autonomous driving operation of the vehicle or when the vehicle is stationary (e.g., during a break in a journey). With some proposed steering wheels, it is additionally possible to convert the tilted steering wheel with only a small number of maneuvers into a table. The tilting mechanism is thereby formed in the region of the steering column. In addition to the tilting function, the steering wheel associated with the steering assembly can be adjusted to the needs of the driver. This may concern primarily the height and the distance of the steering wheel from the driver, wherein the functionality of the steering wheel is thereby generally retained. In such a type of adjustment (e.g., a height adjustment), the steering wheel may remain in a steering position so that the vehicle can be steered.

Modern steering wheels generally comprise a plurality of control elements for the vehicle. By tilting/inclining the steering wheel as a whole, the control and functional elements arranged thereon/therein, such as, for example, switches, selection levers, airbag, the electrical connections or similar components, as well as the steering rim are tilted/inclined. A steering wheel construction adapted to these requirements may be desired. It is also possible for only the steering wheel rim to be tilted. A pin, which locks the rim may be arranged in the hub coaxially with the tilt axis. By use of a special outer contour and the matching recess in the rim, the pin is able to block and, by being pulled out, free the movement of the rim.

Depending on the tilting assembly used, the steering wheel, in a non-steering position, may no longer be suitable for imparting a direction to the vehicle, that is to say for steering the vehicle. If the steering wheel is fixed in this position, theft protection can thus be provided, since the vehicle can no longer be steered manually in this state. It may be desirable to provide a steering assembly and a motor vehicle which have improved theft protection.

SUMMARY OF THE DISCLOSURE

According to a first aspect of the present disclosure, a steering assembly for a vehicle is provided. The steering assembly for a vehicle includes a tilt steering wheel capable of being positioned in at least one steering position and at least one non-steering position, a first locking mechanism for locking the tilt steering wheel in the at least one non-steering position, and a second locking mechanism for additionally locking the tilt steering wheel in the at least one non-steering position, wherein the second locking mechanism comprises a locking device which is movable from a locking position into a release position and vice versa using an actuating mechanism.

According to a second aspect of the present disclosure, a motor vehicle is provided. The motor vehicles includes a steering assembly, a tilt steering wheel capable of being positioned in at least one steering position and at least one non-steering position, a first locking mechanism for locking the tilt steering wheel in the at least one non-steering position, and a second locking mechanism for additionally locking the tilt steering wheel in the at least one non-steering position, wherein the second locking mechanism comprises a locking device which is movable from a locking position into a release position and vice versa using an actuating mechanism.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
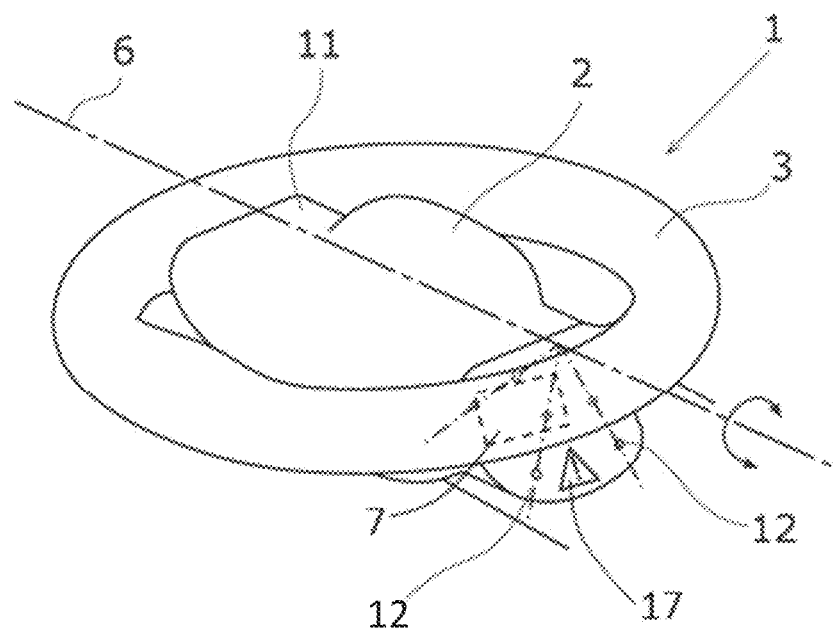
FIG. 1 is a schematic illustration of a steering assembly with a first locking mechanism and a visual warning device, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a steering assembly having a tilt steering wheel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

FIG. 1 shows a steering assembly 1 for use in a vehicle. The steering assembly 1 includes a tilt steering wheel 3 having a hub 2 with two spokes 11 and a rim 3. A first locking mechanism 7 is formed in the rim 3 and the spokes 11. The rim 3 contains all the moving parts of the first locking mechanism 7, such as one or more locking devices 13 and an actuator 23. The actuator 23 is able to pull the locking device 13 out of their receivers 12 and thus enable a tilting movement of the rim 3 about the tilt axis 6. The first locking mechanism 7 is thus released. The rim 3 and thus the tilt steering wheel is shown in FIG. 1 in a non-steering position 5. The joint faces between the hub 2 and the rim 3 are visible in FIG. 1. A visual warning device 17 in the form of a pictogram are applied to these joint faces and are readily visible from outside the vehicle when the tilt steering wheel, or the rim 3, is in a non-steering position. In this embodiment, the one or more locking devices 13 are moved by Bowden cables, which in turn are connected to a drive 25 in the form of an electric motor. In order to block the movement, the one or more locking devices 13 are then pushed back into the receivers 12 by coil springs. The actuator 23 is an actuating mechanism located inside the rim 3 and is shown in FIG. 2.

Figure 2:
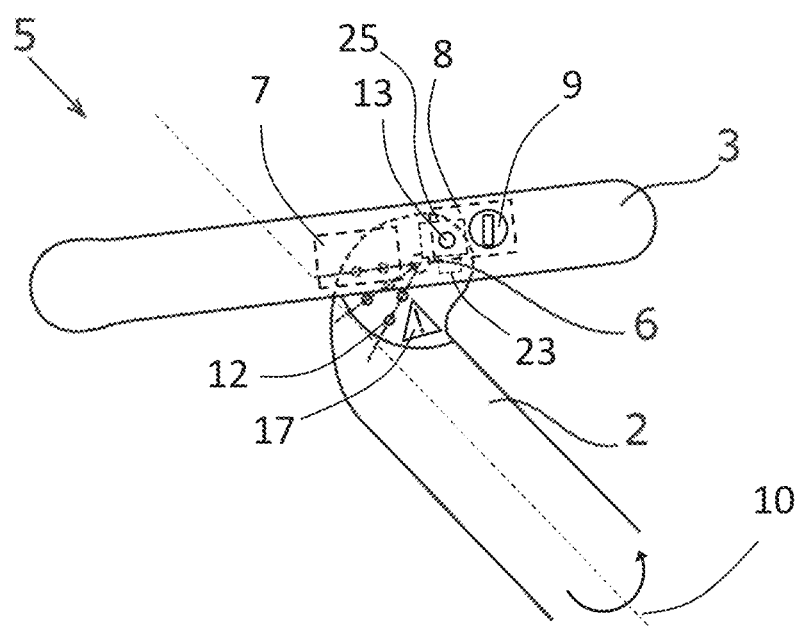
FIG. 2 is a schematic illustration of the steering assembly, according to one embodiment with a second locking mechanism in a non-steering position.

FIG. 2 shows in detail how the corresponding receivers 12 can be formed. In this example, two receivers 12 in the form of receiving bores correspond to a steering position 4 or non-steering position 5. One or more locking devices 13 corresponding to the receivers are located in the first locking mechanism 7. In this embodiment, a second locking mechanism 8 with a further locking device 13 is shown and can in turn be actuated by an actuation interface 9. The actuation interface 9 is in the form of a lock, which in turn can be actuated by, for example, the vehicle key. It can likewise be seen that the visual warning device 17 is visible in the non-steering position 5 shown. In a steering position 4, the visual warning device is concealed by the rim 3 of the tilt steering wheel.

Figure 3:
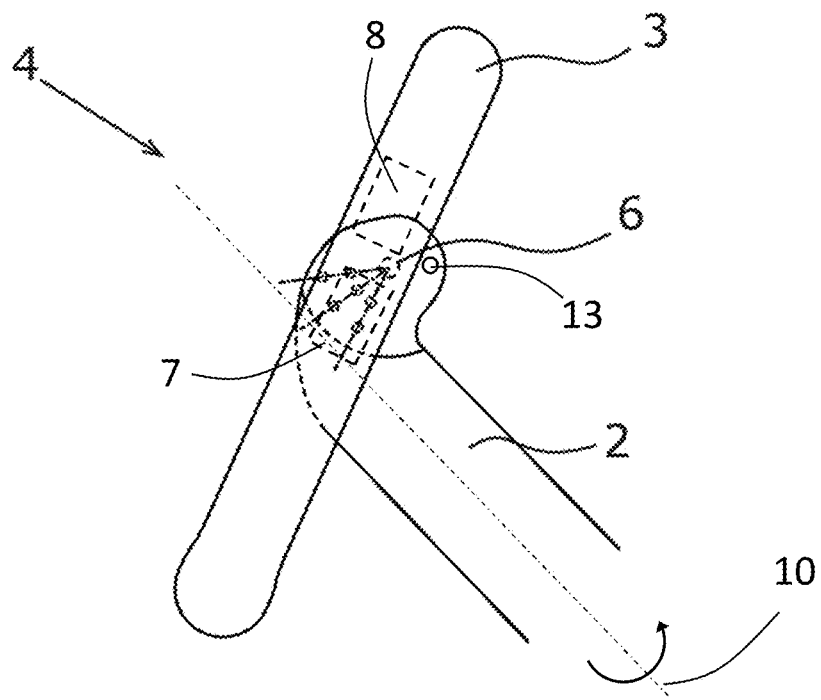
FIG. 3 is a schematic illustration of the steering assembly according to the embodiment of FIG. 2 in an example of a steering position.
Figure 4:
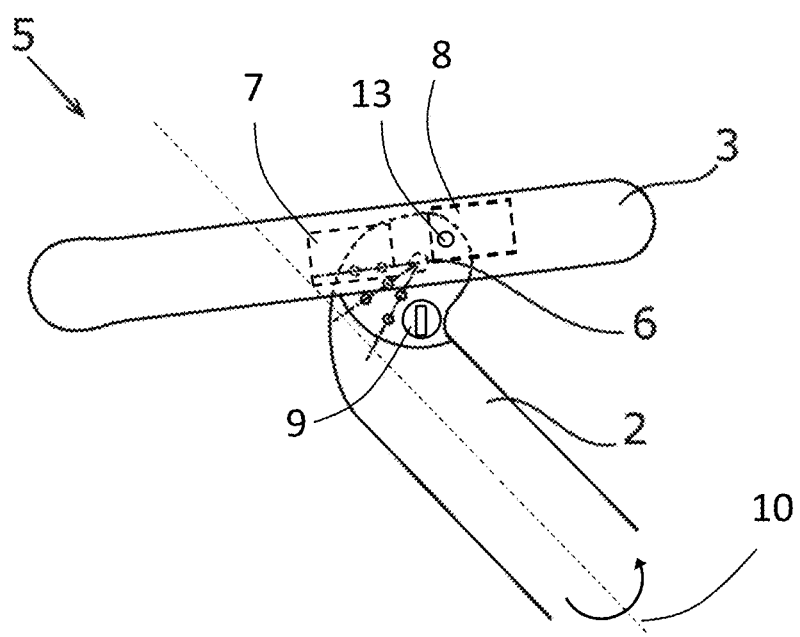
FIG. 4 is a schematic illustration of the steering assembly according to the embodiment in an example of a non-steering position with the actuation interface exposed, wherein the actuation interface is arranged at an alternative location compared to FIG. 2.

FIGS. 3 and 4 show a steering position 4 and a non-steering position 5, respectively. FIG. 3 shows the steering axis 10 about which the tilt steering wheel is able to turn in order to change the direction of the vehicle. The rim 3 of the tilt steering wheel is thereby turned out of the steering position 4 according to the illustration in FIG. 3 about a tilt axis 6, so that an approximately horizontal spatial orientation of the rim 3 according to the illustration in FIG. 4 is reached. Here, the visual warning device 17 is applied to the joint face of the hub 2 and the rim 3 and is readily visible. It is appropriate in an embodiment variant to configure this joint face in a signal color so that it is even more prominent in the non-steering position 5.

FIG. 4 additionally shows another possible embodiment of the actuation interface 9. The actuation interface is here located on the joint face of the hub 2 and the rim 3 and only becomes accessible when the rim 3 has been brought into a non-steering position 4. In this non-steering position, the second locking mechanism 8 can then be actuated and locked via the actuation interface 9.

Figure 5:
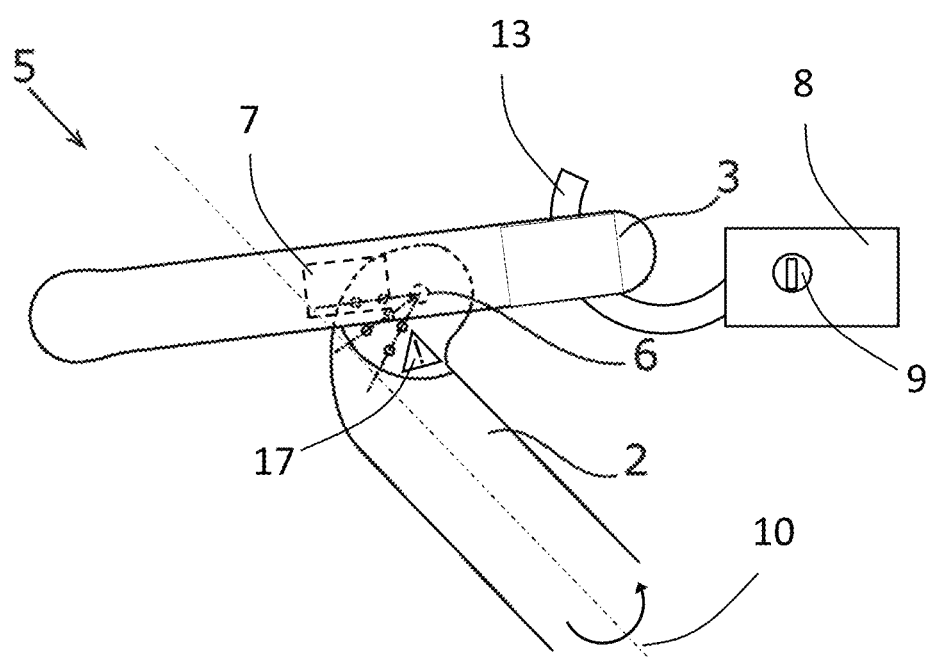
FIG. 5 is a schematic illustration of the steering assembly according to the embodiment in an example of a non-steering position with a second locking mechanism formed outside the tilt steering wheel.

FIG. 5 shows an alternate embodiment of the second locking mechanism 8, which is mounted outside the rim 3. It can be fastened, for example, to the vehicle, so that the locking device 13 can engage into the rim 3 and can block the movement. Depending on the embodiment, this can apply both to the turning of the rim 3 and to the tilting of the rim 3 about the tilt axis 6. The position of the second locking mechanism 8 can in principle be chosen anywhere along the rim 3, for example also on the underside. In this manner, additional theft protection according to the principle of a steering wheel lock or a locking hook is achieved.

The steering assembly, in a non-steering position, prevents the vehicle comprising the steering assembly from being controlled. Theft of the vehicle with a steering assembly in a fixed non-steering position is thus prevented. By providing two (mutually independent) locking mechanisms, the effort required to bring the steering assembly from the non-steering position into the steering position is increased, whereby the theft protection is improved.

It should be pointed out that the features listed individually in the claims can be combined with one another in any technically expedient manner (also over category limits) and indicate further embodiments of the disclosure. The description additionally characterizes and specifies the embodiments of the steering assembly in particular in association with the figures.

It should further be pointed out that a conjunction "and/or" which is used herein between two features and links them together is to be interpreted such that in a first embodiment of the subject-matter of the invention only the first feature can be present, in a second embodiment only the second feature can be present, and in a third embodiment both the first and the second feature can be present.

A steering assembly according to the disclosure for a vehicle comprises a tilt steering wheel which can occupy at least one steering position and at least one non-steering position, wherein the tilt steering wheel can be locked in the at least one non-steering position by use of a first locking mechanism. The steering assembly is distinguished in that the steering assembly comprises a second locking mechanism for additionally locking the tilt steering wheel in the at least one non-steering position, wherein the second locking mechanism comprises a locking device which is movable from a locking position into a release position and vice versa using an actuator.

The steering position is a position in which the vehicle can be steered by use of the tilt steering wheel, while the tilt steering wheel can be adapted via additional adjusting mechanisms to the needs of the driver (e.g., depending on his height and preferences) for operating the vehicle. If the driver does not need the steering wheel, as is the case, for example, when the vehicle is stationary or when an autonomous driving state is being used, the tilt steering wheel can be tilted in order to allow the driver more freedom of movement. Multiple non-steering positions are thereby conceivable. Inter alia, a position of the tilt steering wheel is also conceivable in which the tilt steering wheel is tilted such that a horizontal plane runs through the rim of the tilt steering wheel, wherein the rim of the tilt steering wheel can then be used, for example, as a table. In the context of the present disclosure, the term "tilt steering wheel" can also be understood as meaning only a steering wheel rim (rim).

If the tilt steering wheel is in the way in all positions, it is likewise conceivable to detach it from the steering assembly and stow it elsewhere. In order to arrest the tilt steering wheel in the at least one non-steering position, a first locking mechanism is provided. This can comprise, for example, a locking device which in a corresponding position prevents the tilt steering wheel (steering wheel rim) from being tilted. It can be provided that the locking device can occupy a locking position and a release position. A movement of the locking device from the locking position into the release position and vice versa can be initiated via a mechanical or electronic (e.g., cable-free) actuator. In order to achieve a plurality of non-steering positions, multiple locking device receivers can be provided, into which the locking device are able to engage in order to fix the tilt steering wheel.

A second locking mechanism is provided for additionally locking the tilt steering wheel in at least one non-steering position so that the tilt steering wheel (e.g., despite the first locking mechanism being released) cannot be brought out of the non-steering position into a steering position. This can take place by engagement of a locking device, such as, for example, a pin, into an opening of the tilt steering wheel corresponding to the locking device (e.g., the pin), so that the tilt steering wheel is prevented from tilting about its tilt axis. This locking device can be moved out of the locking position into a release position and vice versa with the aid of an actuator. For example, it could be provided that a drive or a manually actuated mechanism (after corresponding actuation or release with the actuator) moves the pin, as an example of a locking device, out of the opening of the tilt steering wheel, and the movement of the tilt steering wheel about its tilt axis is thus enabled. A mechanical or electronic (e.g., cable-free) actuator can be provided for the actuation.

It can be provided that multiple actuation with actuators of different forms is required for actuating the locking device associated with the first and/or second locking mechanism. For example, it can be provided that the respective locking device can be actuated only using multiple mechanical actuator, multiple electronic (e.g., cable-free) actuators or using at least one mechanical and one electronic (e.g., cable-free) actuator. Such (at least two-fold) securing of the first and/or second locking mechanism inherently increases the theft protection.

The advantageous embodiments described in the dependent claims and further advantageous (or possible) embodiments of the steering assembly proposed with the disclosure will be described in detail hereinbelow. The embodiments described here can at the same time constitute advantageous embodiments of the motor vehicle.

According to a first embodiment of a steering assembly, it can be provided that, in the at least one non-steering position, a visual warning device for indicating that the tilt steering wheel is locked is visible. Such a visual warning device is preferably visible from outside the vehicle, so that, for example, a potential thief is made aware that the tilt steering wheel is in a non-steering position and is locked, and theft is thus made more difficult. In this manner, in addition to the mechanical theft protection, preventive theft protection can be realized, which can prevent, for example, undesired damage to the vehicle which may occur in the case of failed attempts at theft. Preferably, the visual warning device is concealed in a steering position by parts of the tilt steering wheel and is exposed and thus visible only in a non-steering position. The visual warning device can contain warning or deterring information which discourages a potential thief from stealing the vehicle. The visual warning device can further refer to an audible alarm, a GPS vehicle tracking system or the cable-free transfer of information of a potential theft to an external facility (e.g., a server, the police, etc.) in the case of a vehicle theft.

According to a further embodiment of a steering assembly proposed, it can be provided that the visual warning device is in the form of a graphical representation, a representation in text form, an illuminated representation and/or a pictogram. Maximum deterrence is achieved if the potential thief is made aware of the visual warning device as quickly and effectively as possible. This can be achieved by a representation in text form, for example, in large characters, for example in signal colors and in different languages. The signal effect is thereby enhanced if illuminated representations (e.g., using an illumination device) are used, such as, for example, LEDs in signal colors or with a dynamic illumination interval, since experience shows that a person's attention is drawn to a particularly high degree to alternately illuminated objects. Other illumination devices are of course also conceivable.

People often perceive pictograms or symbols more quickly than they perceive representations in text form. A further advantage of the use of pictograms is that they can be understood irrespective of language knowledge. In a simple but effective form of the visual warning device, an area which is exposed by tilting the tilt steering wheel can be configured in a signal color. Thus, for example, in a non-steering position, individual surfaces of the steering assembly are marked by a signal color which is immediately noticeable to an observer, while all other surfaces of the steering assembly are in muted colors and tend not to draw attention to themselves.

According to a further embodiment of a steering assembly, it can be provided that the tilt steering wheel is so adapted that, when it is locked by the first and/or second locking mechanism, it is prevented from turning about a steering axis. If, for example, the first locking mechanism for preventing tilting of the tilt steering wheel is levered into a steering position by external action or is circumvented, although it would be possible to bring the tilt steering wheel into a steering position, the tilt steering wheel, because of the second locking mechanism, could nevertheless be prevented from turning about the steering axis, so that, despite the first locking mechanism being circumvented/levered out, steering of the vehicle is prevented. The same applies to the case where the first locking mechanism likewise prevents the tilt steering wheel from turning about the steering axis. The second locking mechanism can then serve as an additional safety device which counteracts turning of the steering wheel. Locking by the first and/or second locking mechanism can be achieved, for example, in that (additional) locking device (e.g., locking pins) are arranged or formed on the steering axis or an associated component of the tilt steering wheel and prevent the tilt steering wheel from being able to turn about the steering axis. In a further embodiment of the first and/or second locking mechanism, the tilt steering wheel can be uncoupled by way of the locking mechanism in relation to steerability from an associated steering transmission, a steering mechanism or a steering electronics, and thus, although the tilt steering wheel can be turned about the steering axis, this is not transmitted to the vehicle and the steering transmission, steering mechanism or steering electronics thereof.

According to a further embodiment of a steering assembly, it can be provided that the tilt steering wheel, when locked by the first and/or second locking mechanism, is prevented from tilting about a tilt axis. It can be advantageous if one or both locking mechanisms block tilting of the tilt steering wheel. In this manner it is ensured that the tilt steering wheel remains in a non-steering position.

According to a further embodiment of a steering assembly, it can be provided that the second locking mechanism has an actuation interface which is adapted to cooperate with the actuator for initiating movement of the locking device from the locking position into the release position and vice versa. Such an actuating interface can be of electronic or mechanical nature and receive, for example, an input for release or for locking. There can thus be mechanisms, such as, for example, Bowden cables or lever mechanisms, which cause the movement of the locking device, motors and actuators or combinations thereof. In the presence of an input relating to a release, the tilt steering wheel can be adjusted between its steering and non-steering positions. If no release is present, a change of the tilt steering wheel position is prevented, or blocked. Typical actuation interfaces can be configured according to the key-lock principle, in which the actuation interface represents the lock and, for example, a key is provided as the actuator. The key can be a conventional mechanical key or can also be in the form of a wireless key. In the case of the wireless key variant, it can be provided that a cable-free signal exchange takes place between the actuation interface and the actuator. A mobile end device (e.g., a smartphone), a transponder or the like, for example, can be used as the actuator (wireless key) for cable-free signal exchange. By virtue of the wireless key, a signal or command can be transmitted to an actuation interface suitable for receiving such a wirelessly (cable-free) transmitted signal or command. In the case of a mechanical key-lock principle, the actuator can be a conventional key and the actuation interface can be a conventional lock cylinder. It can also be provided to base the first and/or the second locking mechanism on both a mechanical and an electronic key-lock principle. Alternatively or in addition, it can be provided in the case of the first and/or second locking mechanism that the key-lock principle is based on the inputting/retrieval of biometric data, such as, for example, a fingerprint, an iris scan or facial recognition. In this manner too, movement of the locking device from the locking position into the release position and vice versa can be initiated.

According to a further embodiment of a steering assembly, it can be provided that the second locking mechanism has a vehicle actuation interface which is adapted to cooperate with the actuator for initiating the movement of the locking device from the locking position into the release position and vice versa. In this embodiment, the vehicle is capable of accessing the locking mechanism. It is thus conceivable that the vehicle, via a control device, for example an immobilizer or anti-theft warning system, sends a signal via the vehicle actuation interface, which leads to release. The vehicle actuation interface can thereby constitute an actuator and can be provided in addition to the actuator described hereinbefore, so that both the vehicle and, for example, a mechanical actuator, or an actuator in the form of a wireless key, can trigger a signal for release of the locking device. Typical interfaces for such a vehicle actuation interface can be implemented via a CAN bus, FIN bus or W-Lan system.

According to a further embodiment of a steering assembly, it can be provided that the first and/or second locking mechanism provides an anti-theft device. In particular, the first and/or second locking mechanism can be coupled with an anti-theft alarm device of the vehicle. The first and/or second locking mechanism can thus have test device by virtue of which atypical access to the first and/or second locking mechanism can be detected. For example, such a test device can be of mechanical or electronic nature. It is also conceivable that the test device is a measuring device, for example an optical or haptic measuring device. An optical measuring device can be a camera provided in the motor vehicle, or an optical sensor. A haptic measuring device can be, for example, a fingerprint sensor which, in the case of non-authentication, transmits a corresponding signal to the anti-theft alarm device. The anti-theft alarm device can output an audible or visual warning signal. The anti-theft alarm device can also transmit the location of the motor vehicle and the detection of a possible theft in a cable-free manner to an external facility, for example a server or a police station. The transmission of corresponding information to the vehicle owner/vehicle user is also possible by way of cable-free or mobile data communication.

According to a further embodiment of a steering assembly, it can be provided that the locking device is a mechanical device which, in the locking position, mechanically prevents the tilt steering wheel from being tilted and/or turned. Such a mechanical device can be a pin, a claw or the like, which can engage into corresponding openings or anchor points of the tilt steering wheel (steering wheel rim) and thus prevent the tilt steering wheel from moving. Uncoupling between the tilt steering wheel and the steering mechanism of the vehicle is also conceivable, so that the tilt steering wheel can be moved but steering is not possible.

According to a further embodiment of a steering assembly, it can be provided that the locking device has a drive which is adapted to actuate the mechanical device. In addition to manual actuation of the locking device, it can be advantageous that the locking device can be actuated in a supporting manner by a drive. Accordingly, no (low) external forces are required if actuation of the locking device takes place using a lever mechanism. Preferably, the drive is controlled by a control unit, such as a microprocessor-based controller, for example, which can in turn cooperate with an actuation interface and thus function taking account of a release signal.

A motor vehicle having a steering assembly is also provided. The motor vehicle can be a wheeled vehicle, in particular a road vehicle. It can be a passenger car, a truck, an agricultural vehicle, a construction vehicle, a forklift truck, a freight vehicle, a commercial vehicle or the like. The steering system can also be used in two-wheeled vehicles, motorized or electrically operated wheelchairs, electric scooters or the like.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A steering assembly for a vehicle, comprising:
   a tilt steering wheel capable of being positioned in at least one steering position and at least one non-steering position;
   a first locking mechanism for locking the tilt steering wheel in the at least one non-steering position; and
   a second locking mechanism for additionally locking the tilt steering wheel in the at least one non-steering position, wherein the second locking mechanism comprises a locking device which is movable from a locking position into a release position and vice versa using an actuating mechanism, wherein the first and second locking mechanisms are arranged in a non-aligned arrangement, and wherein the tilt steering wheel is adapted such that, when locked by the first and/or second locking mechanism, the tilt steering wheel is prevented from turning about a steering axis.

2. The steering assembly according to claim 1 further comprising a visual warning device for indicating that the tilt steering wheel is locked in the at least one non-steering position.

3. The steering assembly according to claim 2, wherein the visual warning device generates an output in the form of at least one of a graphical representation, a representation in text form, an illuminated representation and a pictogram.

4. The steering assembly according to claim 1, wherein the tilt steering wheel, when locked by the first and/or second locking mechanism, is prevented from tilting about a tilt axis.

5. The steering assembly according to claim 1, wherein the second locking mechanism has an actuation interface which is adapted to cooperate with the actuating mechanism for initiating movement of the locking device from the locking position into the release position and vice versa.

6. The steering assembly according to claim 5, wherein the actuation interface is a vehicle actuation interface.

7. The steering assembly according to claim 1, wherein the first and/or second locking mechanism provides a theft protection device.

8. The steering assembly according to claim 1, wherein the locking device is a mechanical device which, in the locking position, mechanically prevents the tilt steering wheel from tilting and/or turning.

9. The steering assembly according to claim 8, wherein the locking device has an electric motor which is adapted to actuate the mechanical device.

10. A motor vehicle comprising:
    a steering assembly;
    a tilt steering wheel capable of being positioned in at least one steering position and at least one non-steering position;
    a first locking mechanism for locking the tilt steering wheel in the at least one non-steering position; and
    a second locking mechanism for additionally locking the tilt steering wheel in the at least one non-steering position, wherein the second locking mechanism comprises a locking device which is movable from a locking position into a release position and vice versa using an actuating mechanism, wherein the first and second locking mechanisms are arranged in a non-aligned arrangement, and wherein the tilt steering wheel is adapted such that, when locked by the first and/or second locking mechanism, the tilt steering wheel is prevented from turning about a steering axis.

11. The motor vehicle according to claim 10 further comprising a visual warning device for indicating that the tilt steering wheel is locked in the at least one non-steering position.

12. The motor vehicle according to claim 11, wherein the visual warning device generates an output in the form of at least one of a graphical representation, a representation in text form, an illuminated representation and a pictogram.

13. The motor vehicle according to claim 10, wherein the tilt steering wheel, when locked by the first and/or second locking mechanism, is prevented from tilting about a tilt axis.

14. The motor vehicle according to claim 10, wherein the second locking mechanism has an actuation interface which is adapted to cooperate with the actuating mechanism for initiating movement of the locking device from the locking position into the release position and vice versa.

15. The motor vehicle according to claim 14, wherein the actuation interface is a vehicle actuation interface.

16. The motor vehicle according to claim 10, wherein the first and/or second locking mechanism provides a theft protection device.

17. The motor vehicle according to claim 10, wherein the locking device is a mechanical device which, in the locking position, mechanically prevents the tilt steering wheel from tilting and/or turning.

18. The motor vehicle according to claim 17, wherein the locking device has an electric motor which is adapted to actuate the mechanical device.

\* \* \* \* \*